United States Patent
Tsuji et al.

(10) Patent No.: US 10,266,179 B2
(45) Date of Patent: Apr. 23, 2019

(54) APPARATUS FOR CONTROLLING VEHICLE AND CONTROL METHOD

(71) Applicant: HONDA MOTOR CO., LTD., Minato-Ku, Tokyo (JP)

(72) Inventors: Kanta Tsuji, Wako (JP); Mahito Shikama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 131 days.

(21) Appl. No.: 15/513,676

(22) PCT Filed: Sep. 3, 2015

(86) PCT No.: PCT/JP2015/075049
§ 371 (c)(1),
(2) Date: Mar. 23, 2017

(87) PCT Pub. No.: WO2016/047413
PCT Pub. Date: Mar. 31, 2016

(65) Prior Publication Data
US 2017/0297577 A1     Oct. 19, 2017

(30) Foreign Application Priority Data

Sep. 25, 2014   (JP) .................................. 2014-195159

(51) Int. Cl.
*B60T 7/12*   (2006.01)
*F16H 63/48*   (2006.01)
(Continued)

(52) U.S. Cl.
CPC ....... *B60W 30/18109* (2013.01); *B60T 7/042* (2013.01); *B60T 7/12* (2013.01);
(Continued)

(58) Field of Classification Search
None
See application file for complete search history.

(56) References Cited

U.S. PATENT DOCUMENTS

2007/0225117 A1\* 9/2007 Shimizu ................... B60T 7/12
477/182
2010/0048352 A1   2/2010 Yamamoto
(Continued)

FOREIGN PATENT DOCUMENTS

JP        02-069167 U       5/1990
JP        2005-313819 A     11/2005
(Continued)

OTHER PUBLICATIONS

PCT/ISA/210 from PCT/JP2015/075049 with the English translation thereof.

*Primary Examiner* — Colby M Hansen
(74) *Attorney, Agent, or Firm* — Carrier Blackman & Associates, P.C.; William D. Blackman; Fulchand P. Shende

(57) ABSTRACT

The intent to exit a vehicle when a driver attempts to exit a vehicle is detected by an exit intent detection unit, and regardless of whether or not the shift range other than the parking range is detected by a shift range detection unit, a securing control unit controls a vehicle securing unit and secures the vehicle when an intent to secure is detected by a securing intent detection unit. Thus, unintended vehicle movement after exiting is suppressed by securing the vehicle in a stopped state during exiting.

16 Claims, 9 Drawing Sheets

(51) Int. Cl.
| | |
|---|---|
| *B60T 8/17* | (2006.01) |
| *B60W 10/10* | (2012.01) |
| *B60W 40/08* | (2012.01) |
| *B60T 7/14* | (2006.01) |
| *F16H 61/16* | (2006.01) |
| *B60W 30/18* | (2012.01) |
| *B60T 13/58* | (2006.01) |
| *B60W 10/18* | (2012.01) |
| *B60W 10/192* | (2012.01) |
| *B60T 7/04* | (2006.01) |
| *F16H 59/18* | (2006.01) |
| *F16H 59/44* | (2006.01) |
| *F16H 59/50* | (2006.01) |
| *F16H 59/54* | (2006.01) |

(52) U.S. Cl.
CPC .................. *B60T 7/14* (2013.01); *B60T 8/17* (2013.01); *B60T 13/58* (2013.01); *B60W 10/10* (2013.01); *B60W 10/182* (2013.01); *B60W 10/192* (2013.01); *B60W 40/08* (2013.01); *F16H 61/16* (2013.01); *F16H 63/48* (2013.01); *B60W 2540/10* (2013.01); *B60W 2710/1005* (2013.01); *B60W 2710/186* (2013.01); *F16H 59/18* (2013.01); *F16H 59/44* (2013.01); *F16H 59/50* (2013.01); *F16H 59/54* (2013.01)

(56) References Cited

U.S. PATENT DOCUMENTS

2015/0224969 A1\* 8/2015 Huennekens .............. B60T 8/17
    701/48
2017/0015314 A1\* 1/2017 Tanase .................. B60W 30/09

FOREIGN PATENT DOCUMENTS

| JP | 2006-335314 A | 12/2006 |
| JP | 2008-207638 A | 9/2008 |
| JP | 2012-148692 A | 8/2012 |

\* cited by examiner

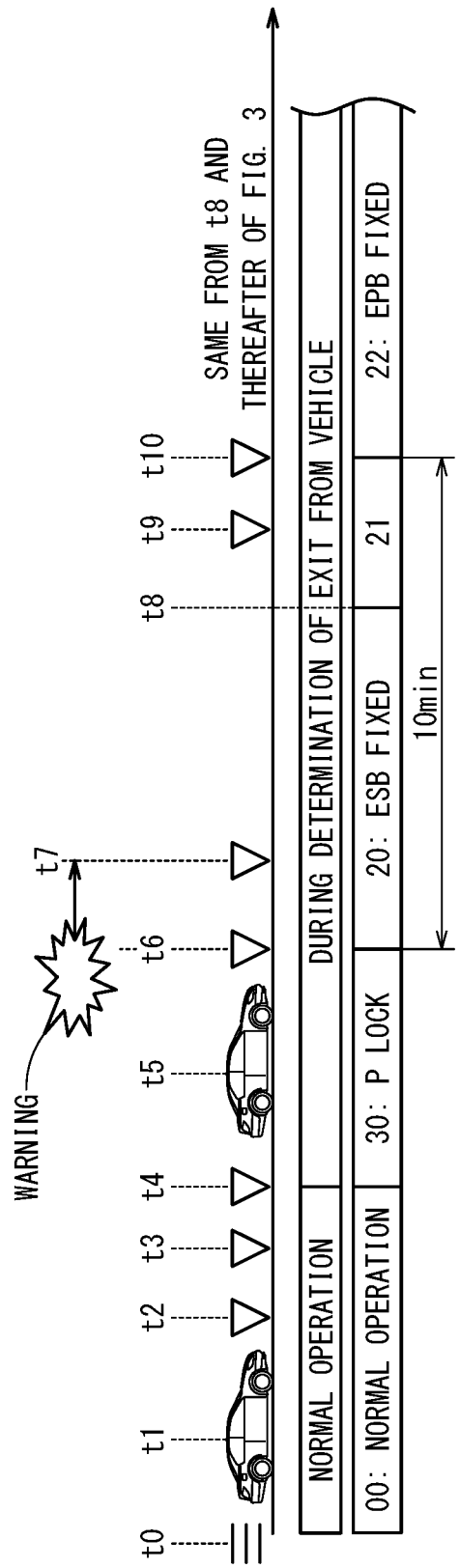

APPARATUS FOR CONTROLLING VEHICLE AND CONTROL METHOD

TECHNICAL FIELD

The present invention relates to a control apparatus for controlling a vehicle and a control method for a vehicle in which a shift range of an automatic transmission is switched by an actuator.

BACKGROUND ART

In Japanese Laid-Open Utility Model Publication No. 02-069167, a shift control is disclosed in which, in the case that a drive position (D) of a shifting device is selected with a shifting device at a time it is detected that the driver has exited from the vehicle, the shifting device is automatically switched to a parking position.

SUMMARY OF INVENTION

In the case of Japanese Laid-Open Utility Model Publication No. 02-069167, when a predetermined operation to exit the vehicle such as opening a door or the like is detected, the parking position is switched to automatically. However, for example, in the case that the driver selects a reverse position while opening the door for the purpose of making a backward glancing confirmation with the intention of parking the vehicle, and after having parked the vehicle and exiting therefrom while leaving the shifting device in the reverse position, the parking position cannot be switched to automatically again. Therefore, there is a concern that the vehicle may not be in a stationary state when the driver exits from the vehicle.

Further, after the parking position has been selected either automatically or by an operation of the driver, for example, when the driver takes out luggage from the passenger seat, there is a possibility that the shifting device may be contacted, and that the shift position will be switched unintentionally to the drive position. In this case, if the driver does not realize that the shift position has been switched, there is a concern that the vehicle will not be in a stationary condition when exiting from the vehicle.

The present invention has the object of providing a control apparatus and a control method for controlling a vehicle in which, by fixing the vehicle in a stopped state at a time of exiting from the vehicle, unintentional movement of a vehicle after having exited therefrom is suppressed.

A control apparatus for controlling a vehicle according to the present invention, in which a shift range of an automatic transmission is switched by an actuator, is characterized by a shift range detecting unit configured to detect a shift range which is selected or set, an exit intent detecting unit configured to detect an intention to exit of a driver who is attempting to exit from a vehicle, a fixing intention detecting unit configured to detect a fixing intention of the driver who is attempting to fix the vehicle in place, and a vehicle fixing unit configured to fix the vehicle in a stopped state, wherein the vehicle is configured to be placed in a fixed state by the vehicle fixing unit, in a case that the intention to exit is detected by the exit intent detecting unit and a shift range other than a parking range is detected by the shift range detecting unit, but that the fixing intention is detected by the fixing intention detecting unit.

In accordance with the control apparatus for controlling a vehicle according to the present invention, after the intention to exit has been detected and the shift range has been switched to the parking range, even in the case that the shift range is switched to something other than the parking range due to some reason, and the driver exits from the vehicle in that state, then in the case it is confirmed that the driver has an intention to fix the vehicle in place, the vehicle is automatically fixed in the stopped state. Therefore, unintentional movement of the vehicle after exiting from the vehicle can be suppressed, and safety can be enhanced.

In the control apparatus for controlling the vehicle according to the present invention, the vehicle may be configured to be placed in the fixed state by the vehicle fixing unit, in a case that the intention to exit is detected by the exit intent detecting unit and the shift range has been switched to the parking range either automatically or by a manual operation of the driver, and thereafter that a shift range other than the parking range is detected by the shift range detecting unit and that the fixing intention is detected by the fixing intention detecting unit.

In accordance with the control apparatus for controlling a vehicle according to the present invention, after the intention to exit is detected, and after the shift range has been switched automatically to the parking range, even in the case that the shift range is switched to something other than the parking range due to some reason, and the driver exits from the vehicle in that state, then in the case it is confirmed that the driver has an intention to fix the vehicle in place, the vehicle is automatically fixed in the stopped state. Therefore, unintentional movement of the vehicle after exiting from the vehicle can be suppressed, and safety can be enhanced.

Further, in the control apparatus for controlling the vehicle according to the present invention, there may further be included a vehicle speed detecting unit configured to detect a vehicle speed, a braking operation detecting unit configured to detect whether a brake pedal is being operated, and a shift operation detecting unit configured to detect a shift range selected by a shifting device. In this case, the fixing intention detecting unit may be configured to determine that the fixing intention exists, in a case that the vehicle speed detected by the vehicle speed detecting unit is less than or equal to a predetermined speed, and either a brake pedal operation by the driver is detected by the braking operation detecting unit, or a shift operation to a neutral range by the driver is detected by the shift operation detecting unit.

If the vehicle speed is less than or equal to the predetermined speed, by using the operation of the brake pedal or the selection or setting of the shift range to the neutral range as a trigger to operate the vehicle fixing unit, then even after the parking range has been switched to automatically, the vehicle can be allowed to travel prior to the occurrence of the trigger by the driver intentionally selecting the driving range, and it is possible to detect the driver's intention to place the vehicle in a fixed state at the time of exiting from the vehicle. Thus, both ease of operation and safety can be achieved.

In the control apparatus for controlling the vehicle according to the present invention, the vehicle fixing unit may be configured to perform at least one of controlling a driving force of the vehicle to be zero, and controlling the vehicle to be placed in the stopped state by a braking unit.

Assuming that at least one of controlling the driving force of the vehicle to be zero, and controlling the vehicle to be placed in the stopped state by the braking unit is performed, even if a malfunction occurs in either one of such controls, the vehicle can be placed in the stopped state by the other control.

In the control apparatus for controlling the vehicle according to the present invention, there may further be provided a shift range control unit configured to switch the shift range automatically to the parking range, in a case that a first predetermined time period has elapsed after the vehicle has been placed in the fixed state automatically by the vehicle fixing unit.

For example, in the case that the electric brake is used as the vehicle fixing unit, if the fixed state continues to be maintained by the vehicle fixing unit, the electric power consumption of the electric brake increases along with the amount of generated heat. However, if a parking lock is applied after the first predetermined time period has elapsed, the fixed state can be maintained in a stable condition. Therefore, the fixed state by the electric brake can be canceled, whereby electric power consumption and the amount of heat generated by the electric brake can be suppressed.

In the control apparatus for controlling the vehicle according to the present invention, after switching to the parking range is completed, the fixed state by the vehicle fixing unit may be configured to be released.

Since the parking lock is applied after elapse of the first predetermined time period, even if the fixed state of the vehicle by the vehicle fixing unit is released, the fixed state of the vehicle can be maintained steadily.

Further, in the control apparatus for controlling the vehicle according to the present invention, the vehicle fixing unit may comprise an electric brake configured to control a brake fluid pressure by a first actuator, and an electric parking brake configured to control a parking brake by a second actuator, wherein, when the vehicle is placed in the fixed state, fixing of the vehicle may be configured to be performed by the electric brake, and in a case that a second predetermined time period has elapsed after operation of the electric brake, the vehicle may be configured to be placed in the fixed state by the electric parking brake.

After operation of the electric brake, assuming that the vehicle is placed in the fixed state by the electric parking brake after elapse of the second predetermined time period, the load on the electric brake can be reduced.

Further, in the control apparatus for controlling the vehicle according to the present invention, after the vehicle has been placed in the fixed state by the electric parking brake, the electric brake may be configured to be released.

Since the electric brake is released after the vehicle has been placed in the fixed state by the electric parking brake, even if the electric brake is released, the fixed state of the vehicle can be maintained steadily.

Further, in the control apparatus for controlling the vehicle according to the present invention, a rise in a driving force of the vehicle may be configured to be made smaller than during a time of normal operation, in a case that after the vehicle has been placed in the fixed state automatically by the vehicle fixing unit, the shift range is switched to a driving range, and an accelerator pedal operation is performed by the driver.

According to a general type of control, since a creep force tends to rise as the brake pedal is restored to its original position, there is a possibility for the vehicle to be driven (undergo movement) while the foot remains placed on the brake pedal. In contrast thereto, according to the control of the present invention, it is necessary for an operation of the accelerator pedal to be performed, and at that time, the foot is separated away from the brake pedal. Therefore, there is a possibility for ease of operation of the vehicle to be affected. However, by lessening the rise in the driving force of the vehicle to be smaller than usual, the ability to control the vehicle can be improved, and it becomes easier to change to the brake pedal.

A control method for a vehicle in which a shift range of an automatic transmission is switched by an actuator is characterized by an exit intent detecting step of detecting an intention to exit of a driver who is attempting to exit from a vehicle, a shift range detecting step of detecting a shift range which is selected or set, a fixing intention detecting step of detecting a fixing intention of the driver who is attempting to fix the vehicle in place, and a vehicle fixing step of placing the vehicle in a fixed state, in a case that the intention to exit is detected in the exit intent detecting step and a shift range other than a parking range is detected in the shift range detecting step, but that the fixing intention is detected in the fixing intention detecting step.

In accordance with the control method for a vehicle according to the present invention, after the intention to exit has been detected and the shift range has been switched to the parking range, even in the case that the shift range is switched to something other than the parking range due to some reason, and the driver exits from the vehicle in that state, then in the case it is confirmed that the driver has an intention to fix the vehicle in place, the vehicle is automatically fixed in the stopped state. Therefore, unintentional movement of the vehicle after exiting from the vehicle can be suppressed, and safety can be enhanced.

In the control method for the vehicle according to the present invention the vehicle is configured to be placed in the fixed state in the vehicle fixing step, in a case that the intention to exit is detected in the exit intent detecting step and the shift range has been switched to the parking range either automatically or by a manual operation of the driver, and thereafter that a shift range other than the parking range is detected in the shift range detecting step and that the fixing intention is detected in the fixing intention detecting step.

In accordance with the control method for a vehicle according to the present invention, after the intention to exit is detected, and after the shift range has been switched automatically to the parking range, even in the case that the shift range is switched to something other than the parking range due to some reason, and the driver exits from the vehicle in that state, then in the case it is confirmed that the driver has an intention to fix the vehicle in place, the vehicle is automatically fixed in the stopped state. Therefore, unintentional movement of the vehicle after exiting from the vehicle can be suppressed, and safety can be enhanced.

According to the present invention, after the intention to exit has been detected and the shift range has been switched to the parking range, even in the case that the shift range is switched to something other than the parking range due to some reason, and the driver exits from the vehicle in that state, then in the case it is confirmed that the driver has an intention to fix the vehicle in place, the vehicle is automatically fixed in the stopped state. Therefore, unintentional movement of the vehicle after exiting from the vehicle can be suppressed, and safety can be enhanced.

BRIEF DESCRIPTION OF DRAWINGS

FIG. 9 is a time chart showing events that occur when exiting from the vehicle and transitions of respective statuses according to a detailed example 7.

DESCRIPTION OF EMBODIMENTS

Figure 1:
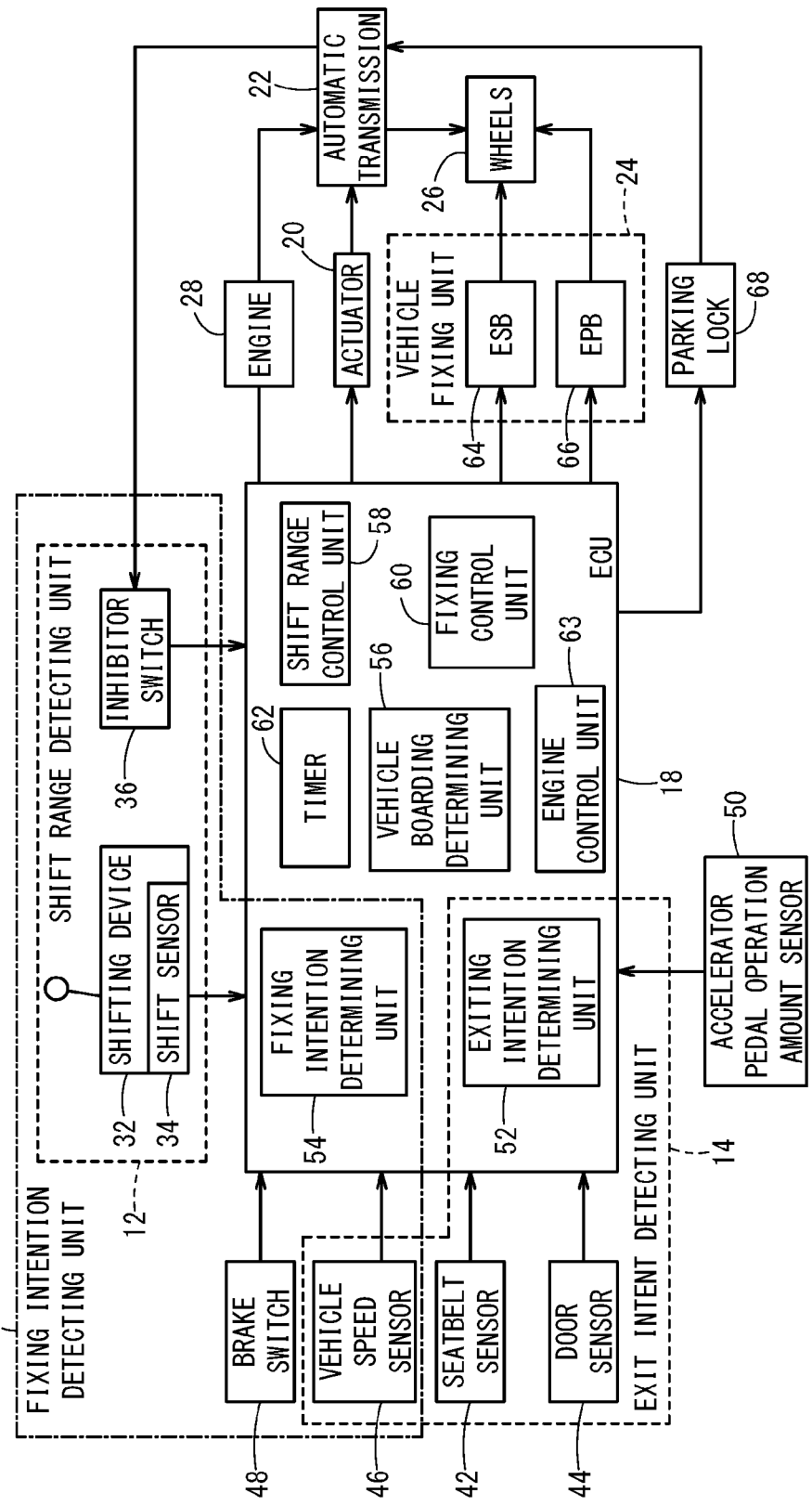
FIG. 1 is a block diagram showing the configuration of a control apparatus for a vehicle according to a present embodiment.

Preferred embodiments of a control apparatus for controlling a vehicle and a control method therefor according to the present invention will be described in detail below with reference to the accompanying drawings. [Configuration of Vehicle Control Apparatus 10] FIG. 1 is a block diagram showing the configuration of a vehicle control apparatus 10 for a vehicle (hereinafter also referred to as a control apparatus 10) according to the present embodiment. The control apparatus 10 serves as a device for controlling a vehicle, in which a shift range of an automatic transmission 22 is switched by an actuator 20, and is equipped with a shift range detecting unit 12 that detects a shift range which is selected or set, an exit intent detecting unit 14 that detects an intention to exit of a driver who is attempting to exit from the vehicle, a shift range control unit 58 that switches the shift range automatically by the actuator 20 to a parking range in the case that the intention to exit has been detected by the exit intent detecting unit 14, a fixing intention detecting unit 16 that detects a fixing intention of the driver who is attempting to fix the vehicle in place, and a vehicle fixing unit 24 that fixes the vehicle in a stopped state. Furthermore, a fixing control unit 60 is provided to place the vehicle in the fixed state by the vehicle fixing unit 24, in the case that the intention to exit is detected by the exit intent detecting unit 14, and the fixing intention is detected by the fixing intention detecting unit 16, even in the case that a shift range other than a parking range is detected by the shift range detecting unit 12.

The vehicle control apparatus 10 is equipped with an ECU (Electronic Control Unit) 18 for carrying out respective controls. The ECU 18 comprises a calculating device such as a microcomputer, and in addition to a central processing unit (CPU), a read only memory (a ROM including an EEPROM), and a random access memory (RAM) that serve as memories, the ECU 18 includes input and output devices such as an A/D converter, a D/A converter, etc., and a timer 62 that serves as a timing unit. By the CPU reading and executing programs stored in the ROM, the CPU functions as an exiting intention determining unit 52, a fixing intention determining unit 54, a vehicle boarding determining unit 56, the shift range control unit 58, and the fixing control unit 60.

The shift range detecting unit 12 includes a shift sensor 34 and an inhibitor switch 36. The shift sensor 34 detects the shift range selected by a shifting device 32, for example, a parking range (P range), a reverse range (R range), a neutral range (N range), a driving range (D range), and a low range (L range), etc., and transmits a shift range signal indicative thereof to the ECU 18. The inhibitor switch 36 detects the range that is set in the automatic transmission 22, and transmits a shift range signal to the ECU 18.

The exit intent detecting unit 14 includes the exiting intention determining unit 52 of the ECU 18, a seatbelt sensor 42, a door sensor 44, and a vehicle speed sensor 46. The seatbelt sensor 42 detects whether a female side buckle and a male side buckle of a driver's seatbelt are unclasped or unfastened, and if so, transmits an open signal to the ECU 18. Further, the seatbelt sensor 42 detects whether the female side buckle and the male side buckle are clasped or fastened, and if so, transmits a closed signal to the ECU 18. The door sensor 44 detects whether a door on the driver's seat side has been opened, and if so, transmits an open signal to the ECU 18. Further, the door sensor 44 detects whether the door is closed, and if so, transmits a closed signal to the ECU 18. The vehicle speed sensor 46 transmits to the ECU 18 as a vehicle speed signal an average value (hereinafter referred to as a vehicle speed) V of the wheel speeds detected by respective wheel speed sensors (not shown) provided in each of wheels 26.

In the case that the signals transmitted from the seatbelt sensor 42 and the door sensor 44 are open signals, and the vehicle speed sensor from the vehicle speed sensor 46 is less than or equal to a predetermined speed V1, the exiting intention determining unit 52 determines that there is an intention of the driver to exit from the vehicle. In other words, an intention to exit is detected.

The fixing intention detecting unit 16 includes the fixing intention determining unit 54 of the ECU 18, the vehicle speed sensor 46, a brake switch (braking operation detecting unit) 48, the shift sensor 34, and the inhibitor switch 36. The brake switch 48 detects whether the brake pedal is being operated, and if so, transmits an ON signal to the ECU 18.

In the case that the signal transmitted from the brake switch 48 is an ON signal, and the vehicle speed V transmitted from the vehicle speed sensor 46 is less than or equal to the predetermined speed V1, or alternatively, in the case that the shift range signal transmitted from the shift sensor 34 or the inhibitor switch 36 is indicative of an N range, and the vehicle speed V transmitted from the vehicle speed sensor 46 is less than or equal to the predetermined speed V1, the fixing intention determining unit 54 determines that there is an intention of the driver to fix the vehicle in place. In other words, a fixing intention is detected.

In the case that the signal transmitted from the door sensor 44 is a closed signal, the shift range signal transmitted from the shift sensor 34 or the inhibitor switch 36 is indicative of a D range or an R range, and the signal transmitted from the brake switch 48 is an ON signal, the vehicle boarding determining unit 56 determines that the driver has boarded the vehicle. It should be noted that it is also possible for the determination of vehicle boarding to be made using signals transmitted to the ECU 18 from other sensors such as the seatbelt sensor 42, the vehicle speed sensor 46, and an accelerator pedal operation amount sensor 50, etc.

The shift range control unit 58 transmits a shift signal to the actuator 20 in accordance with the shift range signal transmitted from the shift sensor 34 of the shifting device 32.

Further, in the case that the exiting intention determining unit 52 detects an intention to exit from the vehicle, the shift range control unit 58 transmits to the actuator 20 the shift signal in order to switch to the P range. Furthermore, after a first predetermined time period has elapsed from operation of an ESB (electric servo brake) 64 of the vehicle fixing unit 24, to be described later, the shift range control unit 58 transmits to the actuator 20 the shift signal in order to switch to the P range. The actuator 20 switches the automatic transmission 22 to a shift range corresponding to the shift signal.

In the case that certain predetermined conditions are satisfied, such as the intention to exit as detected by the exiting intention determining unit 52, the fixing intention as detected by the fixing intention determining unit 54, the shift range detected by the shift sensor 34, and the shift range detected by the inhibitor switch 36, etc., then the fixing control unit 60 transmits to the vehicle fixing unit 24 and a parking lock 68 a fixing signal or a fixing release signal.

The vehicle fixing unit 24 fixes the vehicle in a stopped state according to the fixing signal transmitted from the fixing control unit 60, and carries out a fixing release (i.e., releasing of the fixed state) in accordance with the fixing release signal. The vehicle fixing unit 24 includes the ESB (electric servo brake) 64 and an EPB (electric parking brake) 66. The ESB 64 fixes the wheels 26, or stated otherwise fixes the vehicle, by operating an electric motor and thereby controlling the brake fluid pressure of the master cylinder. The EPB 66 fixes the wheels 26, or stated otherwise fixes the vehicle, by operating electric motors of respective caliper portions and thereby gripping the brake discs with brake pads.

The parking lock 68 locks the output shaft so as not to rotate by engagement of a pawl into a parking gear provided inside the automatic transmission 22, and thereby fixes the vehicle in place.

An engine control unit 63 controls a degree of opening of a throttle valve provided in an engine 28, in accordance with an amount by which the non-illustrated accelerator pedal is operated, as detected by the accelerator pedal operation amount sensor 50. The torque generated by the engine 28 is transmitted to the wheels 26 through the transmission mechanism including the automatic transmission 22, whereby a driving force is generated in the wheels 26. In the driving force, there is also included a driving force generated in the wheels 26 when the engine 28 is in an idling state, i.e., a driving force generated in the wheels 26 in a creep state.

[Transitions of the Vehicle Control]

Figure 2:
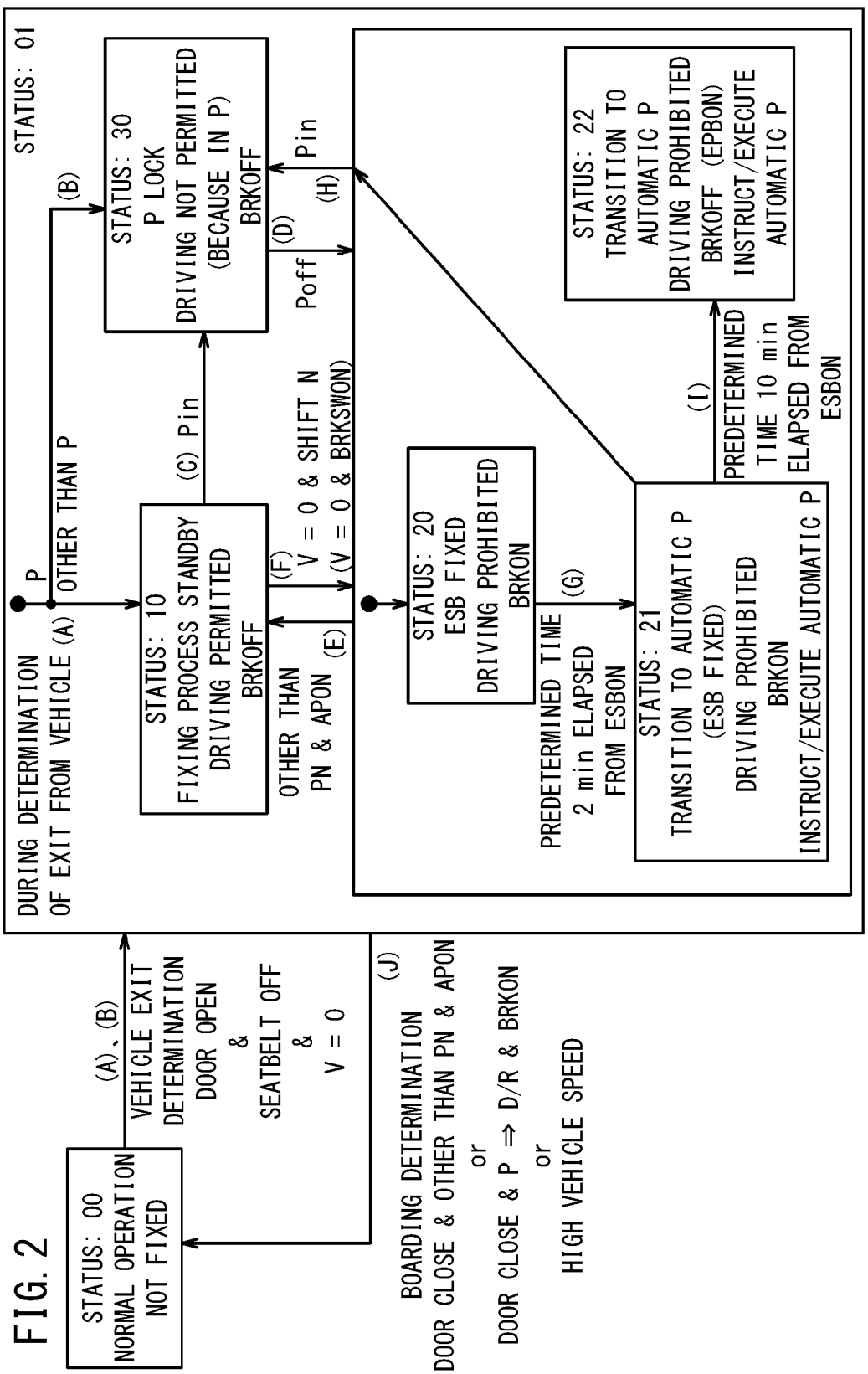
FIG. 2 is a state transition diagram of a vehicle control according to the present embodiment.

In relation to controlling the vehicle in accordance with the present embodiment, overall transitions of such a control will be described with reference to FIG. 2. FIG. 2 is a state transition diagram of the vehicle control according to the present embodiment. In the control for the vehicle according to the present embodiment, there are included an exit intent detecting process of detecting an intention to exit of a driver who is attempting to exit from a vehicle (transitions (A) and (B) from a status 00 to a status 10 or a status 30), a shift range control process (status 30) of controlling the actuator 20 and automatically switching the shift range to the parking range, in the case that the intention to exit is detected in the exit intent detecting process, a shift range detecting process (statuses 10, 30) of detecting the shift range that is being selected or set, a fixing intention detecting process (statuses 10, 30) of detecting a fixing intention of the driver who is attempting to fix the vehicle in place, and a vehicle fixing process (statuses 20, 21, 22) of fixing the vehicle in a stopped state, in the case that the fixing intention is detected in the fixing intention detecting process, even though a shift range other than the parking range is detected in the shift range detecting process after the shift range is switched automatically to the parking range in the shift range control process in the case that the intention to exit is detected in the exit intent detecting process.

<Descriptions of Respective Statuses>

The control is divided into status 00 and status 01. Status 01 is further divided in to statuses 10, 20 through 22, and 30.

During status 00, the vehicle carries out operations in a normal manner. In this state, the vehicle is not fixed by the vehicle fixing unit 24 of the control apparatus 10. During status 01, the intention to exit of the driver is determined in the control apparatus 10.

During status 10, the control apparatus 10 undertakes preparations for the vehicle fixing process by the ESB 64 or the parking lock 68, and then is placed on standby. In this state, the vehicle is not fixed by the ESB 64. At this time, the vehicle is in a state where it is capable of being driven, and the rate at which the driving force rises is kept small.

During status 20, the control apparatus 10 carries out the vehicle fixing process by the ESB 64. Further, during status 20, when the vehicle fixing process by the ESB 64 is initiated, measurement of time by the timer 62 is started.

During status 21, while the control apparatus 10 carries out the vehicle fixing process by the ESB 64, the shift range is switched to the P range. Status 21 is a transient state in which a transition is made from the vehicle fixing process performed by the ESB 64 to the vehicle fixing process performed by the parking lock 68. In statuses 20 and 21, the fixing control unit 60 controls the ESP 64, and generates a braking force including a force for a balance on a slope (a gradient balance) and some additional force in the form of a feed forward (F/F) control. But even so, in the case that the vehicle undergoes movement, an even larger braking force is generated.

During status 22, the control apparatus 10 carries out the vehicle fixing process by the EPB 66. Status 22 corresponds to an alternative to status 30. In the case that some type of trouble or malfunction occurs during status 21 such that transitioning to status 30 is not possible, status 21 instead transitions to status 22.

During statuses 20 through 22, even if the shift range is set to something other than the P range or the N range, since the ESB 64 or the EPB 66 is being operated, driving of the vehicle is prohibited.

During status 30, the control apparatus 10 carries out the vehicle fixing process by the parking lock 68. In this instance, since the shift range is the P range, driving of the vehicle is impossible.

<Conditions for Transitioning Between Statuses>

Transition (A) from status 00 to status 10 is carried out when the seatbelt sensor 42 has detected that the seatbelt of the driver is unclasped, the door sensor 44 has detected that the door on the driver's seat side is opened, and the vehicle speed sensor 46 has detected that the vehicle speed V is less than or equal to the predetermined speed V1 (in this case, V1 is zero). At this time, the exiting intention determining unit 52 detects an intention to exit from the vehicle. Further, in addition to the aforementioned conditions, transition (A) is carried out in the case it is detected by the shift sensor 34 or the inhibitor switch 36 that the shift range is something other than the P range.

Transition (B) from status 00 to status 30 is carried out when the seatbelt sensor 42 has detected that the seatbelt of the driver is unclasped, the door sensor 44 has detected that the door on the driver's seat side is opened, and the vehicle speed sensor 46 has detected that the vehicle speed V is less than or equal to the predetermined speed V1. At this time, the exiting intention determining unit 52 detects an intention to exit from the vehicle. Further, in addition to the aforementioned conditions, transition (B) is carried out in the case it is detected by the shift sensor 34 or the inhibitor switch 36 that the shift range is the P range.

Transition (C) from status 10 to status 30 is carried out when the shift range control unit 58 has switched the shift range automatically to the P range on the basis of detection of the intention to exit by the exiting intention determining unit 52, and the inhibitor switch 36 detects the P range. At this time, the fixing control unit 60 initiates fixing of the vehicle by the parking lock 68.

Transition (D) from status 30 to status 20 is carried out when the shift range control unit 58 has switched the shift range to something other than the P range in accordance with an operation of the shifting device 32, and the shift sensor 34 or the inhibitor switch 36 detects something other than the P range. At this time, the fixing control unit 60 releases the fixed state of the vehicle by the parking lock 68, and initiates fixing of the vehicle by the ESB 64.

Transition (E) from status 20 to status 10 is carried out when it is detected that the shift range control unit 58 has switched the shift range to something other than the P or N range in accordance with an operation of the shifting device 32, the shift sensor 34 or the inhibitor switch 36 has detected something other than the P or N range, and that the accelerator pedal operation amount sensor 50 has detected that the accelerator pedal is operated. At this time, the fixing control unit 60 releases the fixed state of the vehicle by the ESB 64.

Transition (F) from status 10 to status 20 is carried out when the vehicle speed sensor 46 detects that the vehicle speed V is less than or equal to the predetermined speed V1 (in this case, V1 is zero), and the shift range control unit 58 has switched the shift range to the N range in accordance with an operation of the shifting device 32, and the shift sensor 34 or the inhibitor switch 36 detects the N range. This is referred to as Condition 1. At this time, the fixing control unit 60 initiates fixing of the vehicle by the ESB 64.

Transition (F) may be carried out under the following conditions. More specifically, transition (F) may be carried out when the vehicle speed sensor 46 has detected that the vehicle speed V is less than or equal to the predetermined speed V1 (in this case, V1 is zero), and the brake switch 48 has detected that the brake pedal is operated. This is referred to as Condition 2.

Transition (G) from status 20 to status 21 is carried out when the status 20 is performed continuously for a first predetermined time period, for example, when status 20 is performed continuously for 2 minutes. Measurement of the time period is performed by the timer 62.

Transition (H) from status 21 to status 30 is carried out when the shift range control unit 58 has switched the shift range automatically to the P range, and the inhibitor switch 36 detects the P range. At this time, after the fixing control unit 60 has initiated the fixed state of the vehicle by the parking lock 68, the fixed state of the vehicle by the ESB 64 is released.

Transition (I) from status 21 to status 22 is carried out when status 20 is performed continuously for a second predetermined time period, for example, when status 20 is performed continuously for 10 minutes. At this time, the shift range control unit 58 switches the shift range to the P range. Further, the fixing control unit 60 releases the fixed state of the vehicle by the ESB 64, and initiates fixing of the vehicle by the EPB 66.

Transition (J) from status 01 to status 00 is carried out when the door sensor 44 has detected that the driver's seat side door is closed, the shift sensor 34 or the inhibitor switch 36 detects something other than the P or N range, and the accelerator pedal operation amount sensor 50 has detected that the accelerator pedal is operated. Alternatively, transition (J) may be carried out when the door sensor 44 has detected that the driver's seat side door is closed, the shift sensor 34 or the inhibitor switch 36 has detected the operation from the P range to the D or R range, and the brake switch 48 has detected that the brake pedal is operated. Alternatively, transition (J) is carried out when it is detected by the vehicle speed sensor 46 that the vehicle speed V is a high vehicle speed.

Transition (J) may be carried out under the following conditions. More specifically, transition (J) may be carried out when the door sensor 44 has detected that the driver's seat side door is closed, the shift sensor 34 or the inhibitor switch 36 has detected the P range, and the brake switch 48 has detected that the brake pedal is operated. Alternatively, transition (J) may be carried out when the door sensor 44 has detected that the driver's seat side door is closed, the shift sensor 34 or the inhibitor switch 36 has detected the P range, and the seatbelt sensor 42 has detected that the driver's seat side seatbelt is clasped.

DETAILED EXAMPLES OF OPERATIONS

Operations that serve as a reference for the present invention will be described in Detailed Examples 1 to 3, and actual operations of the present invention will be described in Detailed Examples 4 to 7.

Detailed Example 1

Figure 3:
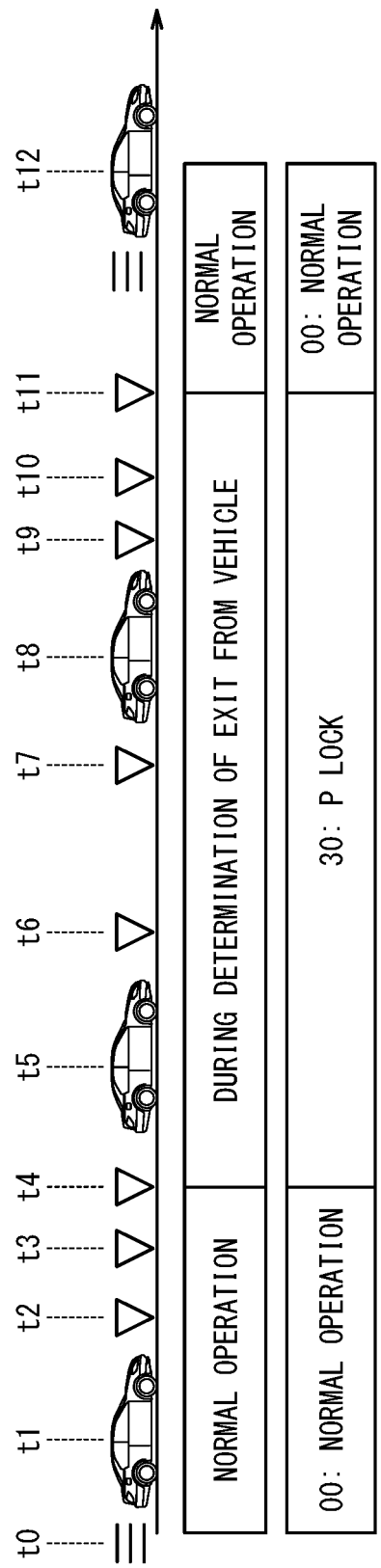
FIG. 3 is a time chart showing events that occur when exiting from the vehicle and transitions of respective statuses according to a detailed example 1.

FIG. 3 is a time chart showing events that occur when exiting from the vehicle and transitions of respective statuses according to a Detailed Example 1. Detailed Example 1 is a generalized example of exiting from the vehicle and boarding the vehicle.

At time t0, the vehicle carries out operations in a normal manner. Such operations are those indicated by status 00 in FIG. 2. When the vehicle is stopped at time t1, the vehicle speed sensor 46 transmits a vehicle speed signal to the ECU 18 indicating that the vehicle speed V is less than or equal to the predetermined speed V1 (in this instance, V1 is zero). At time t2, when the driver operates the shifting device 32 and selects the P range, the shift range control unit 58 transmits a shift signal to the actuator 20 to shift to the P range. The actuator 20 switches the automatic transmission 22 to the P range.

When the seatbelt of the driver's side seat is unclasped at time t3, and the driver's seat side door is opened at time t4, the seatbelt sensor 42 and the door sensor 44 transmit open signals to the ECU 18. Then, on the basis of the open signals from the seatbelt sensor 42 and the door sensor 44, and the vehicle speed signal from the vehicle speed sensor 46, the exiting intention determining unit 52 detects an intention to exit the vehicle. At this time, in accordance with transition (B) shown in FIG. 2, a transition is carried out from status 00 to status 30. The fixing control unit 60 transmits the fixing signal to the parking lock 68 and initiates fixing of the vehicle by the parking lock 68.

The driver exits from the vehicle at time t5, and closes the driver's seat side door at time t6. Thereafter, the driver returns to the vehicle, opens the driver's seat side door at time t7, and boards the vehicle at time t8. When the driver's seat side door is closed at time t9, and the seatbelt of the driver's side seat is clasped at time t10, the door sensor 44 and the seatbelt sensor 42 transmit closed signals to the ECU 18.

Then, at time t11, when the driver operates the shifting device 32 while operating the brake pedal, and selects the D range or the R range from the P range, the brake switch 48 transmits an ON signal to the ECU 18. Further, the shift range control unit 58 transmits to the actuator 20 a shift signal for switching to the D range or the R range. The actuator 20 switches the automatic transmission 22 to the D range or the R range. The shift sensor 34 detects the D range or the R range that was selected, and the inhibitor switch 36 detects the D range or the R range that was set. The vehicle boarding determining unit 56 determines that the vehicle has been boarded on the basis of the closed signal of the door sensor 44, the D range signal or the R range signal of the shift sensor 34 or the inhibitor switch 36, and the ON signal of the brake switch 48. At this time, in accordance with transition (J) shown in FIG. 2, a transition is carried out from status 30 to status 00. The fixing control unit 60 transmits the fixing release signal to the parking lock 68 and releases fixing of the vehicle by the parking lock 68. At time t12, the vehicle becomes capable of traveling.

Detailed Example 2

Figure 4:
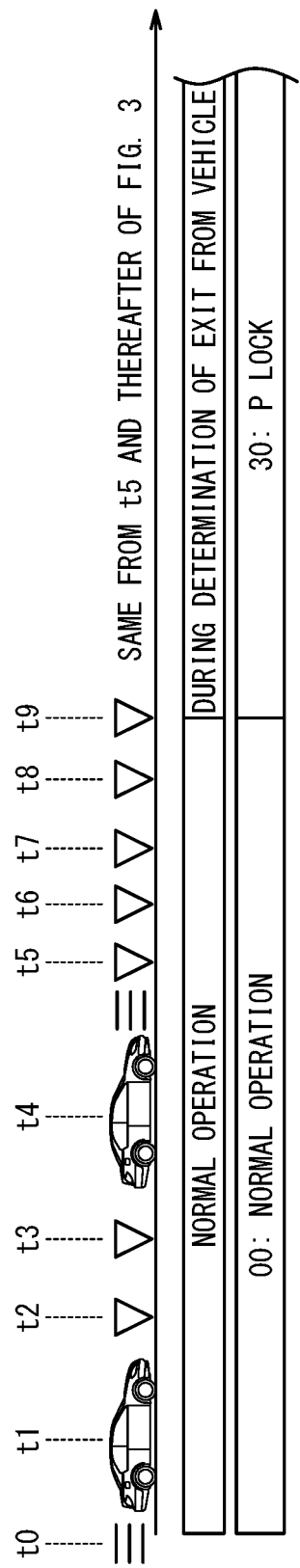
FIG. 4 is a time chart showing events that occur when exiting from the vehicle and transitions of respective statuses according to a detailed example 2.

FIG. 4 is a time chart showing events that occur when exiting from the vehicle and transitions of respective statuses according to a Detailed Example 2. Detailed Example 2 is a generalized example of parking the vehicle in a garage (door opening, reverse garage parking, seatbelt fastened).

At time t0, the vehicle carries out operations in a normal manner. Such operations are those indicated by status 00 in FIG. 2. The vehicle is stopped at time t1, and the driver's seat side door is opened at time t2. At time t3, when the driver operates the shifting device 32 and selects the R range, the shift range control unit 58 transmits a shift signal to the actuator 20 to shift to the R range. The actuator 20 switches the automatic transmission 22 to the R range.

At time t4, the vehicle is driven in reverse, and at time t5, the vehicle is stopped by operating the brake pedal. The vehicle speed sensor 46 transmits a vehicle speed signal to the ECU 18 indicating that the vehicle speed V is less than or equal to the predetermined speed V1 (in this instance, V1 is zero). At time t6, the door is closed once. At time t7, when the driver operates the shifting device 32 and selects the P range, the shift range control unit 58 transmits a shift signal to the actuator 20 to shift to the P range. The actuator 20 switches the automatic transmission 22 to the P range.

When the seatbelt of the driver's side seat is unclasped at time t8, and the driver's seat side door is opened at time t9, the seatbelt sensor 42 and the door sensor 44 transmit open signals to the ECU 18. Then, on the basis of the open signals from the seatbelt sensor 42 and the door sensor 44, and the vehicle speed signal from the vehicle speed sensor 46, the exiting intention determining unit 52 detects an intention to exit the vehicle. At this time, in accordance with transition (B) shown in FIG. 2, a transition is carried out from status 00 to status 30. The fixing control unit 60 transmits the fixing signal to the parking lock 68 and initiates fixing of the vehicle by the parking lock 68. The driver's seat side door is opened at time t9. The events and controls thereafter are the same as the events and controls of time t5 and thereafter of Detailed Example 1.

Detailed Example 3

Figure 5:
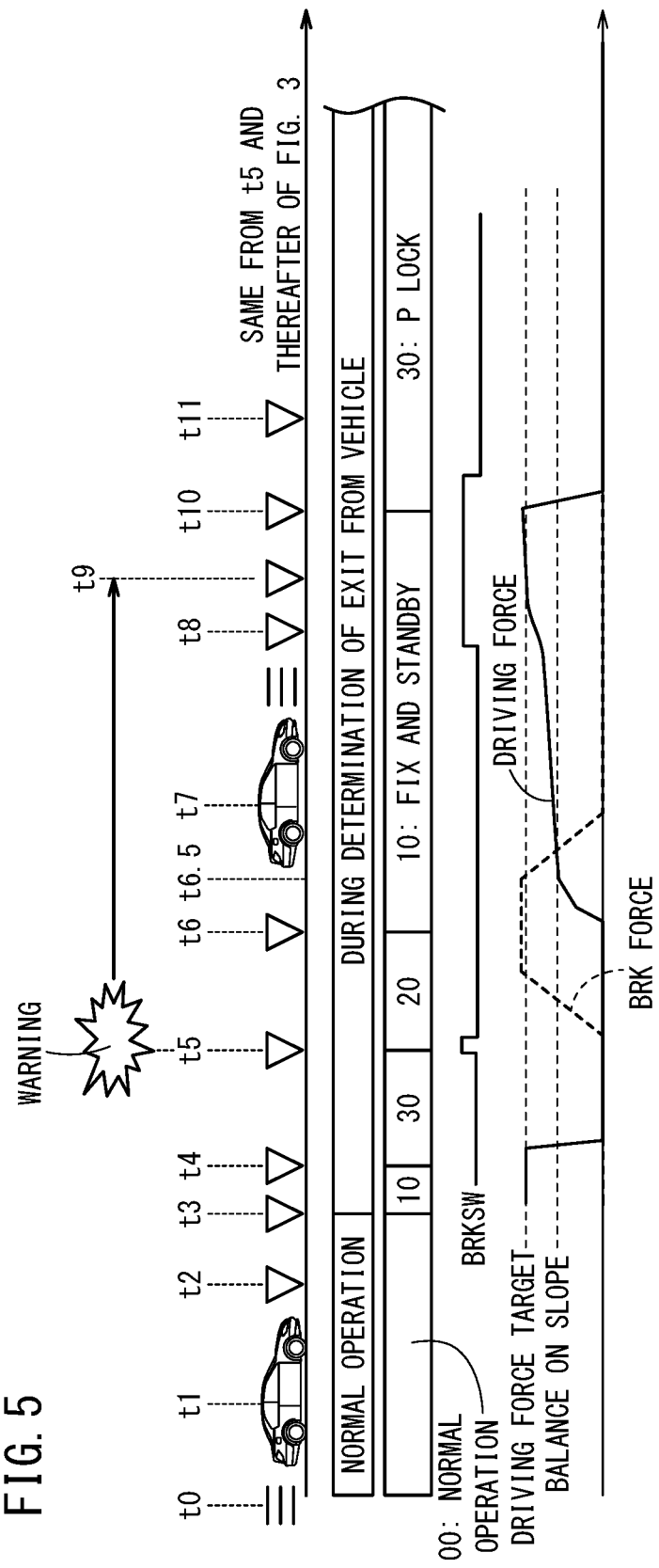
FIG. 5 is a time chart showing events that occur when exiting from the vehicle, and transitions of respective statuses, a braking force, a drive force, and ON and OFF states of a brake switch according to a detailed example 3.

FIG. 5 is a time chart showing events that occur when exiting from the vehicle, and transitions of respective statuses, a braking force, a drive force, and ON and OFF states of a brake switch 48 according to a Detailed Example 3. Detailed Example 3 is a generalized example, which differs from Example 2, of parking of the vehicle in a garage (door opening, reverse garage parking, seatbelt unfastened).

At time t0, the vehicle carries out operations in a normal manner. Such operations are those indicated by status 00 in FIG. 2. When the vehicle is stopped at time t1, the vehicle speed sensor 46 transmits a vehicle speed signal to the ECU 18 indicating that the vehicle speed V is less than or equal to the predetermined speed V1 (in this instance, V1 is zero). When the driver's seat side door is opened at time t2, and the seatbelt of the driver's side seat is unclasped at time t3, the door sensor 44 and the seatbelt sensor 42 transmit open signals to the ECU 18. Then, on the basis of the open signals from the door sensor 44 and the seatbelt sensor 42, and the vehicle speed signal from the vehicle speed sensor 46, the exiting intention determining unit 52 detects an intention to exit the vehicle. At this time, in accordance with transition (A) shown in FIG. 2, a transition is carried out from status 00 to status 10.

At time t4, responsive to the detection of the intention to exit as determined in the exiting intention determining unit 52, the shift range control unit 58 transmits to the actuator 20 a shift signal in order to automatically switch to the P range. The actuator 20 switches the automatic transmission 22 to the P range. The inhibitor switch 36 detects the P range that was set. At this time, in accordance with transition (C) shown in FIG. 2, a transition is carried out from status 10 to status 30. The fixing control unit 60 transmits the fixing signal to the parking lock 68 and initiates fixing of the vehicle by the parking lock 68.

At time t5, when the driver operates the shifting device 32 and selects the R range, the shift range control unit 58 transmits a shift signal to the actuator 20 to shift to the R range. The actuator 20 switches the automatic transmission 22 to the R range. At this time, because the shift range signals of the shift sensor 34 and the inhibitor switch 36 are of something other than the P range (i.e., the R range), in accordance with transition (D) shown in FIG. 2, a transition is carried out from status 30 to status 20. The fixing control unit 60 transmits the fixing release signal to the parking lock 68 and releases fixing of the vehicle by the parking lock 68, together with transmitting the fixing signal to the ESB 64 and initiating fixing of the vehicle by the ESB 64. Moreover, at time t5, a warning is issued. The warning is issued continuously at time t9 until the door is closed.

When the driver operates the accelerator pedal at time t6, the accelerator pedal operation amount sensor 50 transmits an ON signal to the ECU 18. At this time, the shift range signals of the shift sensor 34 and the inhibitor switch 36 are of something other than the P or N range (i.e., the R range), and because the signal from the accelerator pedal operation amount sensor 50 is ON, in accordance with transition (E) shown in FIG. 2, a transition is carried out from status 20 to status 10. The fixing control unit 60 transmits the fixing release signal to the ESB 64 and releases the fixed state of the vehicle by the ESB 64.

At time t7, the vehicle is driven in reverse, and at time t8 when operation of the brake pedal is started, the vehicle is stopped. At time t9, the door on the driver's seat side is closed once, and at time t10, when the driver operates the shifting device 32 and selects the P range, the shift range control unit 58 transmits a shift signal to the actuator 20 to shift to the P range. The actuator 20 switches the automatic transmission 22 to the P range. At this time, because the shift range signals of the shift sensor 34 and the inhibitor switch 36 are of something other than the P range (i.e., the R range), in accordance with transition (C) shown in FIG. 2, a transition is carried out from status 10 to status 30. The fixing control unit 60 transmits the fixing signal to the parking lock 68 and initiates fixing of the vehicle by the parking lock 68. The driver's seat side door is opened at time t11. The events and controls thereafter are the same as the events and controls of time t5 and thereafter of Detailed Example 1.

Next, transitions of the driving force in Detailed Example 3 will be described. When the P range is switched to at time t4, the driving force decreases to zero. Thereafter, by switching to the R range at time t5, and operating the accelerator pedal at time t6, the driving force starts to rise. At the start of such rising, the driving force rises without any limit imposed until a balance on a slope. At this time, in order to ensure safety, the rate at which the driving force rises is smaller than usual. At time t6.5, the driving force arrives at a certain balance on the slope, and thereafter, the rate at which the driving force rises is limited. At time t8, when the brake switch 48 is turned ON accompanying operation of the brake pedal, the limitation on the rising rate is released, and the driving force rises until reaching a target value. In addition, when the P range is switched to at time t10, the driving force decreases to zero.

Next, transitions of the braking force in Detailed Example 3 will be described. The braking force of the ESB 64 changes in the following manner in accordance with the control of the fixing control unit 60. When the ESB 64 is operated upon transitioning to status 20 at time t5, the brake fluid pressure gradually rises, and along therewith, the braking force gradually rises until reaching a certain constant braking force. At time t6, even if the accelerator pedal is operated and a transition takes place from status 20 to status 10, the braking force of the ESB 64 does not decrease immediately, but rather is maintained at the constant range for a certain period. The braking force is maintained within the constant range until time t6.5 when the driving force arrives at the balance on the slope, and thereafter, the braking force gradually decreases to zero.

Detailed Example 4

Figure 6:
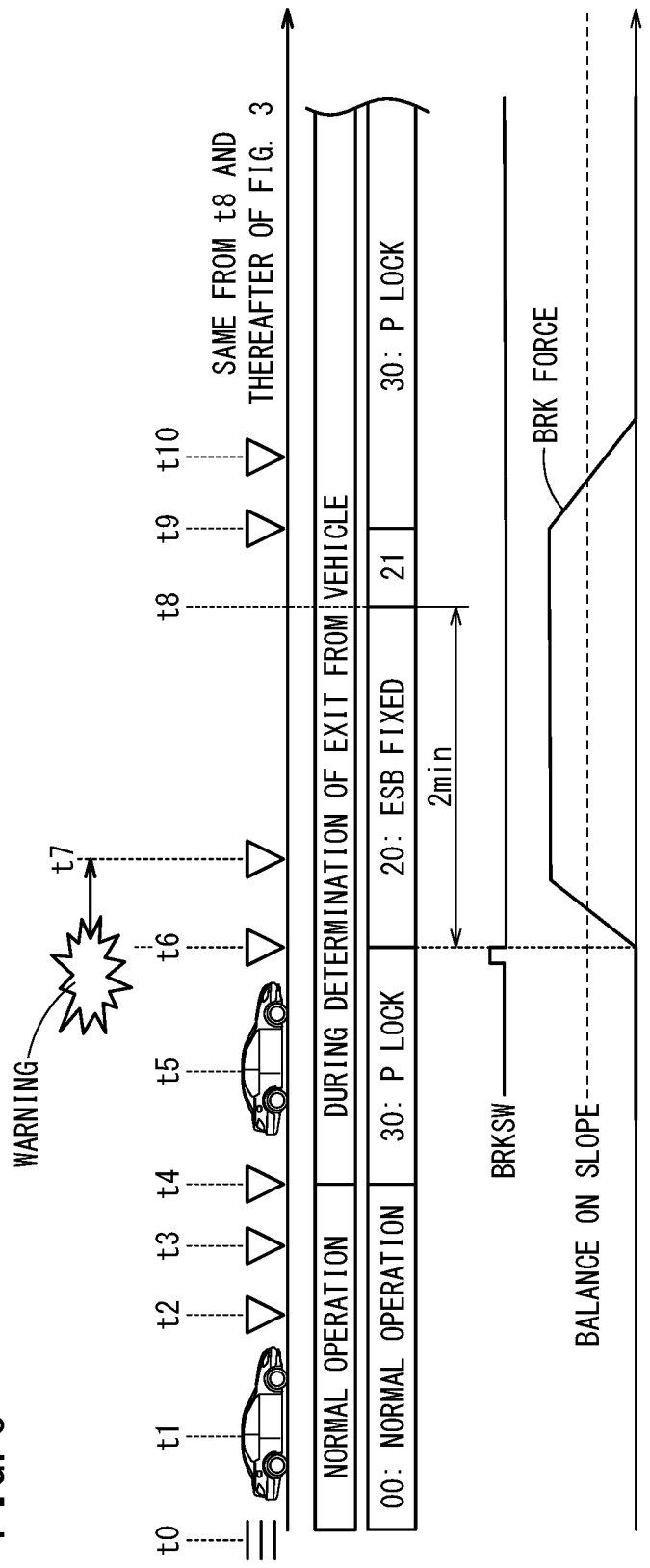
FIG. 6 is a time chart showing events that occur when exiting from the vehicle, and transitions of respective statuses, a braking force, and ON and OFF states of a brake switch according to a detailed example 4.

FIG. 6 is a time chart showing events that occur when exiting from the vehicle, and transitions of respective statuses, a braking force, and ON and OFF states of the brake switch 48 according to a Detailed Example 4. Detailed Example 4 illustrates an irregular example of exiting from the vehicle and boarding the vehicle (exiting from the vehicle outside of the P range).

The events and statuses from time t1 to time t5 are the same as the events and statuses from time t1 to time t5 of Detailed Example 1.

In particular, a case is illustrated in which, when exiting from the vehicle, the driver unintentionally operates the shifting device 32. For example, when trying to take a package out from the front passenger seat side of the vehicle, the package or the driver himself may come into contact with the shifting device 32, whereupon an unintended and mistaken operation of the shifting device 32 may occur.

At time t6, such an event takes place, and when the driver mistakenly operates the shifting device 32 and selects the N range, the shift range control unit 58 transmits a shift signal to the actuator 20 to shift to the N range. The actuator 20 switches the automatic transmission 22 to the N range. On the basis of the vehicle speed signal (V=0) of the vehicle speed sensor 46, and the shift range signal (N range) of the shift sensor 34 and the inhibitor switch 36, the fixing intention determining unit 54 detects the fixing intention to fix the vehicle. At this time, in accordance with transition (D) shown in FIG. 2, a transition is carried out from status 30 to status 20. The fixing control unit 60 transmits the fixing release signal to the parking lock 68 and releases fixing of the vehicle by the parking lock 68, together with transmitting the fixing signal to the ESB 64 and initiating fixing of the vehicle by the ESB 64. Further, simultaneously with operation of the ESB 64, measurement of time by the timer 62 of the ECU 18 is started.

At time t6, because a warning is issued, it may also be assumed that the driver realizes the mistaken operation of the shifting device 32. However, below, a case is considered in which the driver does not realize the mistaken operation of the shifting device 32.

The driver closes the driver's seat side at time t7. At time t8, when the time period measured by the timer 62 reaches the first predetermined time period (2 minutes), then in accordance with transition (G) shown in FIG. 2, a transition is carried out from status 20 to status 21. At this point in time, fixing of the vehicle by the ESB 64 is continued.

At time t9, responsive to the time period of the timer 62 having surpassed the first predetermined time period (2 minutes), the shift range control unit 58 automatically transmits to the actuator 20 a shift signal in order to switch to the P range. The actuator 20 switches the automatic transmission 22 to the P range. The inhibitor switch 36 detects the P range that was set. At this time, in accordance with transition (H) shown in FIG. 2, a transition is carried out from status 21 to status 30. The fixing control unit 60 transmits the fixing signal to the parking lock 68, and after fixing of the vehicle by the parking lock 68 has been started, the fixing release signal is transmitted to the ESB 64, and the fixed state of the vehicle by the ESB 64 is released. The driver's seat side door is opened at time t10. The events and controls thereafter are the same as the events and controls of time t8 and thereafter of Detailed Example 1.

The transitions of the braking force in this instance will be described. The braking force of the ESB 64 changes in the following manner in accordance with the control of the fixing control unit 60. When the ESB 64 is operated upon transitioning to status 20 at time t6, the brake fluid pressure gradually rises, and along therewith, the braking force gradually rises until reaching a certain constant braking force. Even upon transitioning to status 30 at time t9, the braking force of the ESB 64 does not decrease immediately, but rather decreases gradually. If the braking force of the ESB 64 were decreased immediately to zero, shaking would occur in the vehicle. In order to prevent the occurrence of such shaking, the fixing control unit 60 gradually decreases the braking force of the ESB 64.

Detailed Example 5

Figure 7:
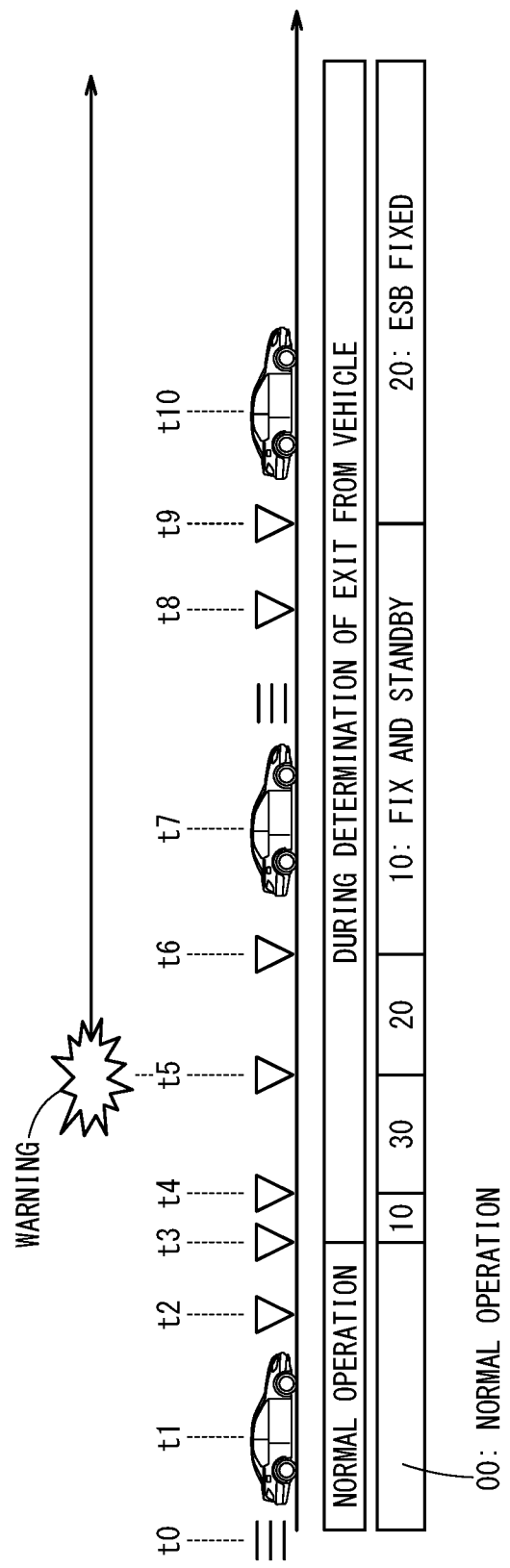
FIG. 7 is a time chart showing events that occur when exiting from the vehicle and transitions of respective statuses according to a detailed example 5.

FIG. 7 is a time chart showing events that occur when exiting from the vehicle and transitions of respective statuses according to a Detailed Example 5. Detailed Example 5 is an irregular example of parking of the vehicle in a garage (door opening, reverse garage parking, seatbelt unfastened, and exiting from the vehicle while in the N range).

The events and statuses from time t1 to time t8 are the same as the events and statuses from time t1 to time t8 of Detailed Example 3.

In particular, a case is illustrated in which, when exiting from the vehicle, the driver forgets to operate the shifting device 32 to the P range. For example, a case is illustrated in which, after having operated the shifting device 32 to the N range, the driver exits from the vehicle while misconstruing the N range and the P range.

At time t9, such an event takes place, and when the driver operates the shifting device 32 and selects the N range, the shift range control unit 58 transmits a shift signal to the actuator 20 to shift to the N range. The actuator 20 switches the automatic transmission 22 to the N range. On the basis of the vehicle speed signal (V=0) of the vehicle speed sensor 46, and the shift range signal (N range) of the shift sensor 34 and the inhibitor switch 36, the fixing intention determining unit 54 detects the fixing intention to fix the vehicle. At this time, in accordance with transition (F) shown in FIG. 2, a transition is carried out from status 10 to status 20. The fixing control unit 60 transmits the fixing signal to the ESB 64 and initiates the fixed state of the vehicle by the ESB 64. Further, simultaneously with operation of the ESB 64, measurement of time by the timer 62 of the ECU 18 is started. The driver exits from the vehicle at time t10.

Detailed Example 6

Figure 8:
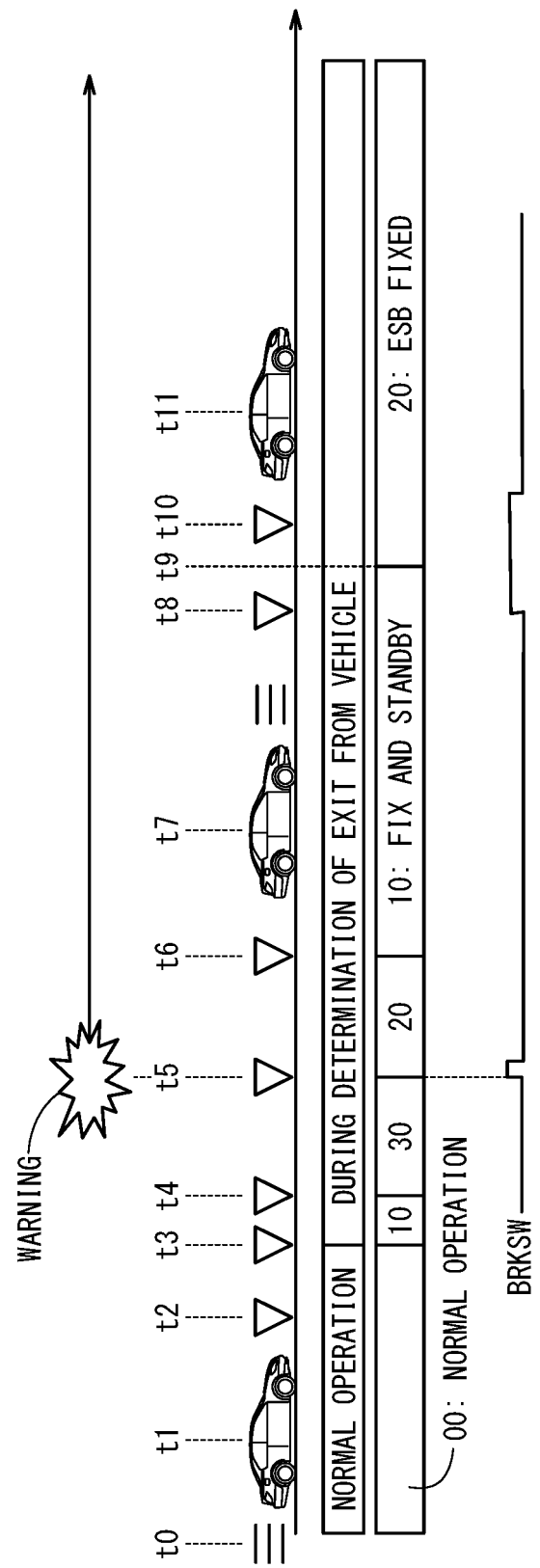
FIG. 8 is a time chart showing events that occur when exiting from the vehicle, and transitions of respective statuses, and ON and OFF states of a brake switch according to a detailed example 6.

FIG. 8 is a time chart showing events that occur when exiting from the vehicle, and transitions of respective statuses, and ON and OFF states of a brake switch 48 according to a Detailed Example 6. Detailed Example 6 is an another embodiment of Detailed Example 5, which presents an irregular example of parking the vehicle in a garage (door opening, reverse garage parking, seatbelt unfastened, and exiting from the vehicle while the shift range is not in the P or N range). In Detailed Example 5, as a condition for transitioning from status 10 to status 20 shown in FIG. 2, a condition 1 is set in which there is described as a condition the aforementioned transition (F) of the "conditions for transitioning between statuses". On the other hand, in Detailed Example 6, a condition 2 is set in which there is described as a condition the aforementioned transition (F) of the "conditions for transitioning between statuses".

The events and statuses from time t1 to time t7 are the same as the events and statuses from time t1 to time t7 of Detailed Example 3 and Detailed Example 5.

At time t7, the vehicle is driven in reverse, and at time t8 when operation of the brake pedal is started, the brake switch 48 transmits an ON signal to the ECU 18. When the vehicle is stopped at time t9, the vehicle speed sensor 46 transmits a vehicle speed signal to the ECU 18 indicating that the vehicle speed V is less than or equal to the predetermined speed V1 (in this instance, V1 is zero). On the basis of the vehicle speed signal (V=0) of the vehicle speed sensor 46 and the ON signal of the brake switch 48, the fixing intention determining unit 54 detects the fixing intention to fix the vehicle. At this time, in accordance with transition (F) shown in FIG. 2, a transition is carried out from status 10 to status 20. The fixing control unit 60 transmits the fixing signal to the ESB 64 and initiates the fixed state of the vehicle by the ESB 64. Further, simultaneously with operation of the ESB 64, measurement of time by the timer 62 of the ECU 18 is started.

At time t10, even if the operation of shifting to the P range by the shifting device 32 fails, and a range other than the P range is selected, fixing of the vehicle by the ESB 64 is continued. The driver exits from the vehicle at time t11.

Detailed Example 7

FIG. 9 is a time chart showing events that occur when exiting from the vehicle and transitions of respective statuses according to a Detailed Example 7. Detailed Example 7 illustrates an irregular example of exiting from the vehicle and boarding the vehicle (exiting from the vehicle outside of the P range, the occurrence of a malfunction in automatic parking).

The events and statuses from time t1 to time t8 are the same as the events and statuses from time t1 to time t8 of Detailed Example 4.

At time t9, responsive to the time period of the timer 62 of the ECU 18 having surpassed the first predetermined time period (2 minutes), the shift range control unit 58 transmits to the actuator 20 a shift signal in order to automatically switch to the P range. However, if a malfunction occurs in the mechanism related to automatic parking (the actuator 20, the automatic transmission 22, the parking lock 68, etc.), switching to the P range or operation of the parking lock 68 cannot be carried out.

Measurement of time by the timer 62 of the ECU 18 starts from time t6, and when the time period measured by the timer 62 reaches the second predetermined time period (10 minutes) at time t10, then in accordance with transition (I) shown in FIG. 2, a transition is carried out from status 21 to status 22. The fixing control unit 60 transmits the fixing release signal to the ESB 64 and releases the fixed state of the vehicle by the ESB 64, together with transmitting the fixing signal to the EPB 66 and initiating fixing of the vehicle by the EPB 66. The events and controls thereafter are the same as the events and controls of time t10 and thereafter of Detailed Example 4.

Advantages and Effects of the Present Embodiments

In accordance with the present embodiments, after the intention to exit from the vehicle has been detected by the exit intent detecting unit 14 and the shift range has been switched to the parking range, even in the case that the shift range is switched to something other than the parking range due to some reason, and the driver exits from the vehicle in that state, then in the case it is confirmed by the fixing intention detecting unit 16 that the driver has an intention to fix the vehicle in place, the fixing control unit 60 controls the vehicle fixing unit 24, and the vehicle is automatically fixed in the stopped state (transition (F) from status 10 to status 20, transition (D) from status 30 to status 20). Therefore, unintentional movement of the vehicle after exiting from the vehicle can be suppressed, and safety can be enhanced.

According to the present embodiments, if the vehicle speed V is less than or equal to the predetermined speed V1, by using the operation of the brake pedal or the selection or setting of the shift range to the neutral range as a trigger to operate the vehicle fixing unit 24, then even after the parking range has been switched to automatically, the vehicle can be allowed to travel prior to the occurrence of the trigger by the driver intentionally selecting the driving range, and because it is possible to detect the driver's intention to place the vehicle in a fixed state at the time of exiting from the vehicle, both ease of operation and safety can be achieved.

For example, in the case that the ESB 64 is used as the vehicle fixing unit 24, if the fixed state continues to be maintained by the ESB 64, the electric power consumption of the ESB 64 increases along with the amount of generated heat. However, if the parking lock 68 is applied after the first predetermined time period (2 minutes) has elapsed, the fixed state can be maintained in a stable condition. Therefore, the fixed state by the ESB 64 can be canceled, whereby electric power consumption and the amount of heat generated by the ESB 64 can be suppressed.

The present invention is not limited to the embodiments described above, and it goes without saying that various alternative or additional configurations could be adopted therein without deviating from the essence and gist of the present invention.

For example, in the above-described embodiments, the vehicle is assumed to be one having an engine as a drive source for the vehicle. However, the principles of the present invention can also be applied to other types of vehicles, such as electric vehicles including an EV (electric vehicle), an HEV (hybrid vehicle), a PHEV (plug-in hybrid vehicle), and an FCV (fuel cell vehicle), which are equipped with drive motors as the driving source for the vehicle.

According to the above embodiments, when the vehicle is placed in a fixed condition, the ESB 64 and the EPB 66 control the vehicle to be in a stopped state. However, instead of such a control, it is possible to carry out a control in which the driving force of the vehicle is made zero by setting the shift range to a neutral range. In this case, the shift range control unit 58 transmits to the actuator 20 a shift signal for switching to the neutral range. The actuator 20 switches the automatic transmission 22 to the neutral range corresponding to the shift signal.

The invention claimed is:

1. A control apparatus for controlling a vehicle in which a shift range of an automatic transmission is switched by an actuator, said control apparatus comprising:
    a shift range detecting unit configured to detect a shift range which is selected or set;
    an exit intent detecting unit configured to detect an intention to exit of a driver who is attempting to exit from a vehicle;
    a fixing intention detecting unit configured to detect a fixing intention of the driver who is attempting to fix the vehicle in place; and
    a vehicle fixing unit configured to fix the vehicle in a fixed state;
    when the intention to exit is detected by the exit intent detecting unit and a shift range other than a parking range is detected by the shift range detecting unit, but the fixing intention is detected by the fixing intention detecting unit, then the vehicle is configured to be placed in a fixed state by the vehicle fixing unit,
    and wherein, after the vehicle has been automatically placed in the fixed state by the vehicle fixing unit, when the shift range is switched to a driving range, and an accelerator pedal operation is performed by the driver, then a rise in a driving force of the vehicle is configured to be made smaller than during a time of normal operation.

2. The control apparatus for controlling the vehicle according to claim 1, wherein the vehicle is configured to be placed in the fixed state by the vehicle fixing unit, when the intention to exit is detected by the exit intent detecting unit and the shift range has been switched to the parking range either automatically or by a manual operation of the driver, and thereafter, a shift range is switched again and the shift range other than the parking range is detected by the shift range detecting unit and the fixing intention is detected by the fixing intention detecting unit.

3. The control apparatus for controlling the vehicle according to claim 1, further comprising:
    a vehicle speed detecting unit configured to detect a vehicle speed;
    a braking operation detecting unit configured to detect whether a brake pedal is being operated; and
    a shift operation detecting unit configured to detect a shift range selected by a shifting device;
    wherein the fixing intention detecting unit is configured to determine that the fixing intention exists, when the vehicle speed detected by the vehicle speed detecting unit is less than or equal to a predetermined speed, and either a brake pedal operation by the driver is detected by the braking operation detecting unit, or a shift operation to a neutral range by the driver is detected by the shift operation detecting unit.

4. The control apparatus for controlling the vehicle according to claim 1, wherein the vehicle fixing unit is configured to perform at least one of controlling a driving force of the vehicle to be zero, and controlling the vehicle to be placed in the stopped state by a braking unit.

5. The control apparatus for controlling the vehicle according to claim 1, further comprising a shift range control unit configured to switch the shift range automatically to the parking range, when a first predetermined time period has elapsed after the vehicle has been placed in the fixed state automatically by the vehicle fixing unit.

6. The control apparatus for controlling the vehicle according to claim 5, wherein after switching to the parking range is completed, the fixed state by the vehicle fixing unit is configured to be released.

7. The control apparatus for controlling the vehicle according to claim 1, the vehicle fixing unit comprising:
    an electric brake configured to control a brake fluid pressure by a first actuator; and
    an electric parking brake configured to control a parking brake by a second actuator;
    wherein, when the vehicle is placed in the fixed state, fixing of the vehicle is configured to be performed by the electric brake, and when a second predetermined time period has elapsed after operation of the electric brake, then the vehicle is configured to be placed in the fixed state by the electric parking brake.

8. The control apparatus for controlling the vehicle according to claim 7, wherein after the vehicle has been placed in the fixed state by the electric parking brake, the electric brake is configured to be released.

9. A control method for a vehicle in which a shift range of an automatic transmission is switched by an actuator, said control method comprising:
    an exit intent detecting step of detecting an intention to exit of a driver who is attempting to exit from a vehicle;
    a shift range detecting step of detecting a shift range which is selected or set;
    a fixing intention detecting step of detecting a fixing intention of the driver who is attempting to fix the vehicle in place; and
    a vehicle fixing step of placing the vehicle in a fixed state, when the intention to exit is detected in the exit intent detecting step and a shift range other than a parking range is detected in the shift range detecting step, and fixing intention is detected in the fixing intention detecting step, wherein when the intention to exit is detected in the exit intent detecting step and the shift range has been switched to the parking range either automatically or by a manual operation of the driver, and thereafter a shift range is switched again and the shift range other than the parking range is detected in the shift range detecting step and the fixing intention is detected in the fixing intention detecting step, then the vehicle is placed in the fixed state in the vehicle fixing step.

10. A control apparatus for controlling a vehicle in which a shift range of an automatic transmission is switched by an actuator, said control apparatus comprising:

a shift range detecting unit configured to detect a shift range which is selected or set;

an exit intent detecting unit configured to detect an intention to exit of a driver who is attempting to exit from a vehicle;

a fixing intention detecting unit configured to detect a fixing intention of the driver who is attempting to fix the vehicle in place; and a vehicle fixing unit configured to fix the vehicle in a fixed state;

wherein when the intention to exit is detected by the exit intent detecting unit and a shift range other than a parking range is detected by the shift range detecting unit, and the fixing intention is detected by the fixing intention detecting unit, then the vehicle is configured to be placed in the fixed state by the vehicle fixing unit, and wherein when the intention to exit is detected by the exit intent detecting unit and the shift range has been switched to the parking range, either automatically or by a manual operation of the driver, and thereafter a shift range is switched again and the shift range other than the parking range is detected by the shift range detecting unit and the fixing intention is detected by the fixing intention detecting unit, then the vehicle is configured to be placed in the fixed state by the vehicle fixing unit.

11. The control apparatus for controlling the vehicle according to claim 10, further comprising:

a vehicle speed detecting unit configured to detect a vehicle speed;

a braking operation detecting unit configured to detect whether a brake pedal is being operated; and a shift operation detecting unit configured to detect a shift range selected by a shifting device;

wherein when the vehicle speed detected by the vehicle speed detecting unit is less than or equal to a predetermined speed, and either a brake pedal operation by the driver is detected by the braking operation detecting unit or a shift operation to a neutral range by the driver is detected by the shift operation detecting unit, then the fixing intention detecting unit is configured to determine that the fixing intention exists.

12. The control apparatus for controlling the vehicle according to claim 10, wherein the vehicle fixing unit is configured to perform at least one of controlling a driving force of the vehicle to be zero, and controlling the vehicle to be placed in the fixed state by a braking unit.

13. The control apparatus for controlling the vehicle according to claim 10, further comprising a shift range control unit, wherein when a first predetermined time period has elapsed after the vehicle has been placed in the fixed state automatically by the vehicle fixing unit, then the shift range control unit switches the shift range automatically to the parking range.

14. The control apparatus for controlling the vehicle according to claim 13, wherein after switching to the parking range is completed, the fixed state by the vehicle fixing unit is configured to be released.

15. The control apparatus for controlling the vehicle according to claim 10, wherein the vehicle fixing unit comprises:

an electric brake configured to control a brake fluid pressure by a first actuator; and an electric parking brake configured to control a parking brake by a second actuator;

and wherein when the vehicle is placed in the fixed state, then fixing of the vehicle is configured to be performed by the electric brake, and when a second predetermined time period has elapsed after operation of the electric brake, then the vehicle is configured to be placed in the fixed state by the electric parking brake.

16. The control apparatus for controlling the vehicle according to claim 15, wherein after the vehicle has been placed in the fixed state by the electric parking brake, the electric brake is configured to be released.

* * * * *